(No Model.)
C. F. BRUSH.
SECONDARY BATTERY ELEMENTS.
No. 263,756. Patented Sept. 5, 1882.
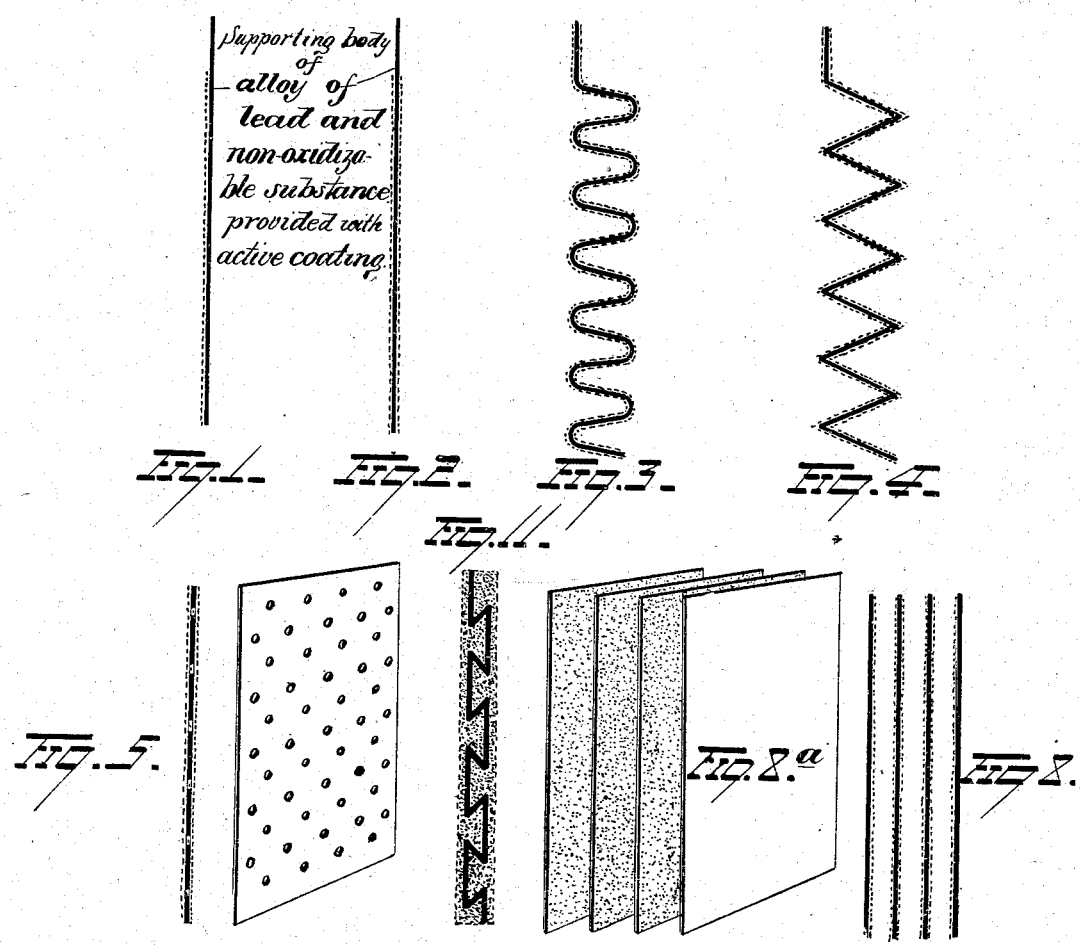
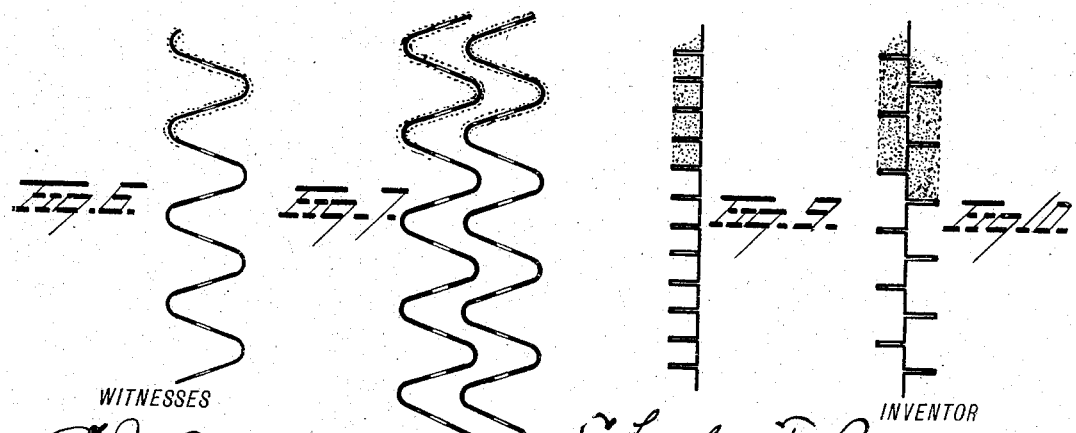
WITNESSES
INVENTOR
Charles F. Brush.
By Leggett & Leggett
Attorney

UNITED STATES PATENT OFFICE.

CHARLES F. BRUSH, OF CLEVELAND, OHIO.

SECONDARY-BATTERY ELEMENT.

SPECIFICATION forming part of Letters Patent No. 263,756, dated September 5, 1882.

Application filed June 13, 1882. (No model.)

*To all whom it may concern:*

Be it known that I, CHARLES F. BRUSH, of Cleveland, in the county of Cuyahoga and State of Ohio, have invented certain new and useful Improvements in Secondary-Battery Elements; and I do hereby declare the following to be a full, clear, and exact description of the invention, such as will enable others skilled in the art to which it pertains to make and use the same.

My invention relates to secondary or so-called "electrical" storage-batteries, and more particularly to the elements employed in such batteries.

Said invention consists in the employment of an alloy of lead with a non-oxidizable material—such as gold, platinum, or equivalent substance—in the construction of secondary-battery elements.

Said invention also consists in a secondary-battery element having either its supporting-core or its entire body primarily composed of an alloy of lead and a non-oxidizable substance.

My invention therefore includes a battery element consisting of a supporting body or core of the alloy mentioned, to which core is applied or attached in any effective manner the substance that is to constitute the absorbing or active coating or portion of the element, and it likewise includes a battery element primarily consisting throughout of said alloy.

It is desirable in a secondary battery that the elements should present the greatest amount of active material and have a minimum quantity of the idle or non-acting material that merely serves as an electro-conducting support for the active portion of the element; and one of the objects sought and to a high degree attained by my present invention is a large reduction in the amount of material necessary for the non-acting supporting and conducting portion of a secondary-battery element.

I do not limit myself to any specific form of element, as my invention is equally applicable without modification to an indefinite variety of styles. My invention, however, is admirably adapted to the construction of elements made up of very thin strips or plates, or to the type that I have styled the "filament form" of element.

I will briefly specify how battery-elements of the two kinds last mentioned can be constructed according to my invention.

Take plates, strips, or wires of the alloy hereinbefore mentioned and attach or apply to the surface thereof, in any effective manner, a coating or covering of any substance suitable for being or becoming the active or absorbing portion of the element.

Among the substances that may be attached or applied to the alloy core may be mentioned the following, viz: oxide of lead, electro-deposited lead, a mixture of metallic lead and lead-oxide, or superficially-oxidized particles of lead.

In case that either a mixture of metallic lead and lead oxide, or superficially-oxidized particles of lead be used, the alloy core may be covered with either in a powdered or finely-divided state; and if heavy pressure be now applied, the mixture of lead and lead oxide, or the superficially-oxidized lead particles, will be welded into a firm and strongly-coherent mass, and the mass will be welded or intimately and effectively applied to the alloy core. In the operation of "forming" such an element the electric current will not only act upon the coating or covering just described, but it will also superficially affect the core by converting the lead in the surface of the alloy into peroxide of lead, thus rendering the platinum or gold surface of the core rough or porous, and greatly facilitating and insuring the adhesion to the core of the active coating, because the interstices between the pores of the core are now filled with peroxide of lead, which is integral with the peroxide of lead of the active coating proper.

In case the alloy core is in the sheet form it may be bent, corrugated, roughened, perforated, slotted, or otherwise prepared; and if the wire or filament form of core be used, a number of them may be electrically connected together, either at one or both ends, and arranged in a substantially parallel relation with each other, or they may be twisted into a skein or bunched together in any manner, or they may be woven into a netting or fabric.

Instead of the alloy being composed simply of lead and platinum, or lead and gold, it may consist of lead with any other non-oxidizable alloy or substance whatever. The amount of lead in the alloy should be so limited in quantity that the oxidizing action, in forming the element, shall be confined to the surface of the alloy, the interior portions being practically protected by the excess of non-oxidizable metal. Such a construction will permit of the use of very thin wires, sheets, or strips of the alloy without danger of complete oxidation, thus effecting an economy in the amount of the expensive non-oxidizable material forming the supporting and electro-conducting core, and obtaining a very large amount of available active material for any given amount of space occupied by the element.

My description has thus far been confined to an embodiment of my invention in the form of an element composed of an alloy core or body covered or coated with a suitable substance for constituting the active or absorbing portion of the element.

Another form of element to which my invention is equally applicable is one wherein the element is primarily constructed entirely from the alloy mentioned, without any coating or covering excepting that which is obtained by the forming process. Obviously this form of element will not be so effective for general purposes as the form already specified, consisting of the alloy core with its coating primarily applied.

To make an element simply from the alloy, take plates, strips, or wires of said alloy, and assemble or construct them into any desired style of element, and subject them to the forming process, when it will be found that the element has an exterior spongy or porous surface, owing to the oxidation of the lead in the surface of the alloy, while the non-oxidized interior of the element will constitute its supporting body or core. In this condition we have the spongy or porous platinum, (or gold,) retaining in its interstices the peroxide of lead obtained by the action of the electric current during the forming process just referred to, and in this product we have the material for an effective element.

From the foregoing description it is apparent that my invention effects a reduction to the minimum of the non-acting supporting and conducting portion of the element, and that it also prevents the loss of charge in a secondary battery due to local action between the active portion of the element and its supporting-body.

In the drawings, Figure 1 is an edge view of a plate or plan view of a wire or strip covered on one side with an active coating. Fig. 2 is a similar view with the active coating applied to both sides. Figs. 3 and 4 represent the same corrugated; Fig. 5, the same perforated; Fig. 6, the same perforated and corrugated. Fig. 7 shows two corrugated plates with their folds entering each other. Figs. 8 and 8$^a$ represent assemblages of plates constructed as described. Figs. 9 and 10 show plates folded so as to form supporting ribs or shelves for the active coating. Fig. 11 shows a sectional view of a plate or strip having dovetail corrugations. When pressure is applied to the coating on this form of plate the coating is obviously grasped and retained against displacement.

In the foregoing description I have designated gold and platinum as "non-oxidizable" substances, meaning by this that they are practically non-oxidizable as employed in secondary batteries.

For the sake of convenience in distinguishing this among other inventions of mine in the class of secondary batteries, I denominate it as "Case S."

What I claim is—

1. In a secondary-battery element, the combination (in the form of an alloy) of lead and a non-oxidizable substance, substantially as set forth.

2. A secondary-battery element having its active or absorbing coating, substance, or surface applied to and connected with a core or body consisting of an alloy of lead and a non-oxidizable substance.

3. A secondary-battery element consisting primarily of an alloy of lead and a non-oxidizable substance.

4. A secondary-battery element consisting of a perforated plate, sheet, or strip composed primarily of an alloy of lead and a non-oxidizable substance with an active or absorptive coating applied thereto, substantially as set forth.

In testimony whereof I have signed my name to this specification in the presence of two subscribing witnesses.

CHARLES F. BRUSH.

Witnesses:
LEVERETT L. LEGGETT,
ALBERT E. LYNCH.